June 16, 1931. G. R. McDERMOTT 1,810,776
METHOD OF CONTROLLING COMBUSTION IN METALLURGICAL AND GLASS FURNACES
Filed July 24, 1925
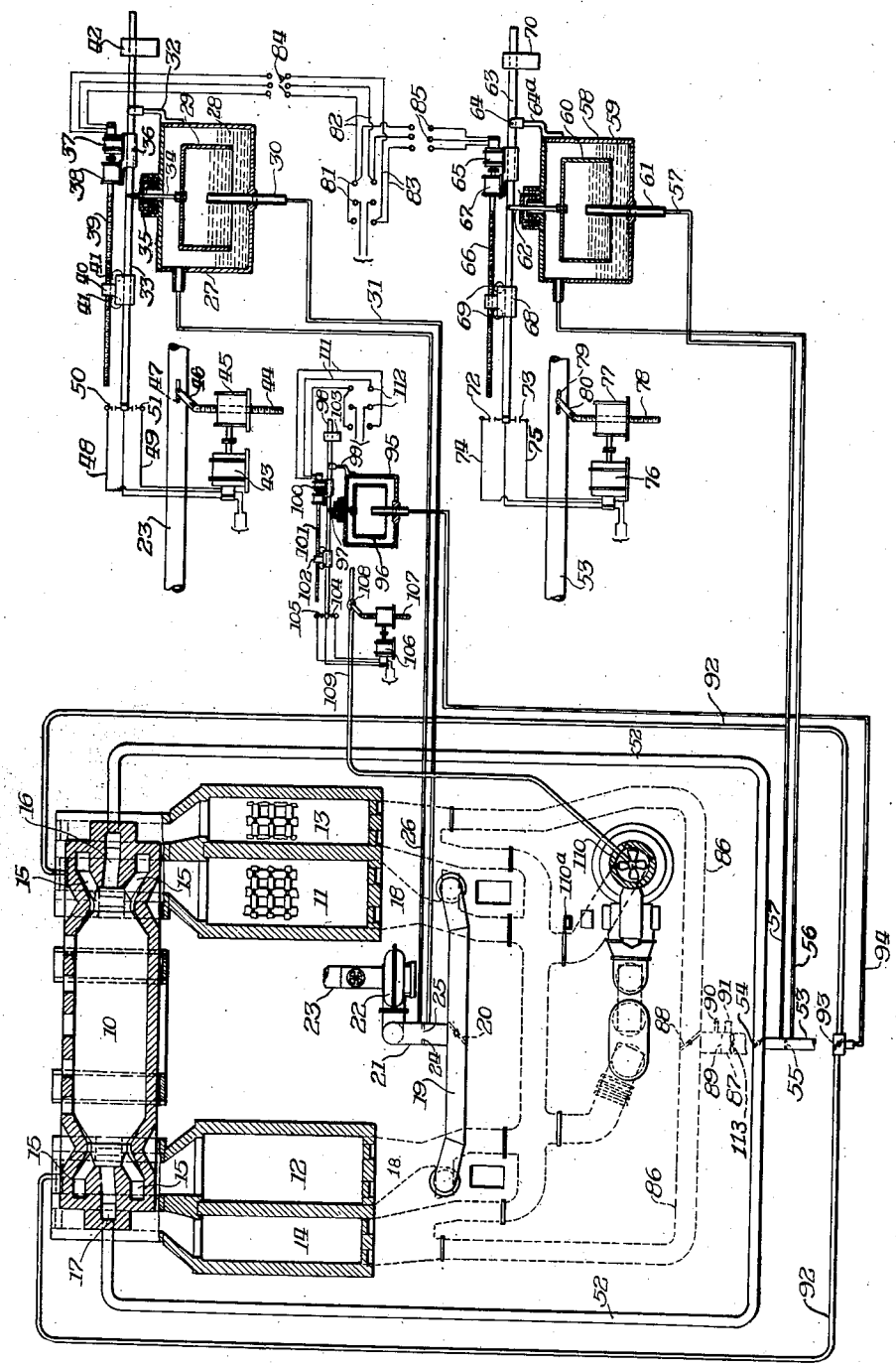
Witness:
Inventor:
George R. McDermott.
By
Atty.

Patented June 16, 1931

1,810,776

UNITED STATES PATENT OFFICE

GEORGE R. McDERMOTT, OF CHICAGO, ILLINOIS

METHOD OF CONTROLLING COMBUSTION IN METALLURGICAL AND GLASS FURNACES

Application filed July 24, 1925. Serial No. 45,824.

My invention relates to a method of automatic control of the combustion in metallurgical and glass furnaces and one of its objects is to provide for so controlling the quantity of air and gas supplied to the furnace, and so regulating flow of one of these elements with relation to the flow of the other that a measured and proper mixture may be supplied and maintained automatically to the furnace.

A further object of my invention is the provision of fuel control for metallurgical furnaces which is uniform at all times and by means of which a uniform rate of combustion is maintained in the furnace, thereby insuring a higher combustion efficiency in the operation of the furnace and a material saving of fuel required for the operation of the furnace.

For example: In the operation of an open hearth furnace specifically illustrated and described in the following specification, the air for combustion is alternately supplied to each end of the furnace after having passed through the air regenerator at such end of the furnace. The air flow to the furnace is created by mechanical means which forces the air through the regenerators where it is heated to a very high temperature by the checker-work in the regenerators and by the flues, which have been previously heated by the passage therethrough of the wastes gases from the furnace on their way to the atmosphere through the furnace stack which they reach, either directly or through superheaters or waste heat boilers, depending upon the particular practice followed. It has become common practice to provide an induction fan to assist in the removal of the waste gases from the furnace, and my method of control contemplates both forcing the air into the regenerative chambers and controlling the flow of gas with relation thereto, and the removal of the waste gases by an induction fan placed adjacent the stack for withdrawing the waste gases from the furnace. The waste gases in their passage from the furnace port through the flues and air regenerators deposit dust, dirt, slag and the like in the air regenerators, thus tending to restrict these passages and clog them up, thereby increasing the resistance to the flow of the air and gases therethrough as the life of the furnace increases. This means that there is a constantly increasing resistance to the flow of the air and gas and also the waste gases, and in order to maintain proper combustion in the furnace an additional pressure of air is required in order to overcome this resistance and maintain the required volume and insure proper combustion in the furnace. This result is accomplished by increasing the pressure upon the air forced into the furnace.

In the matter of the fuel supply to the furnace, the common practice is to operate a furnace either with natural gas, producer gas, or with coke-oven gas. Where natural gas and coke-oven gas are used the fuel is delivered directly to the furnace port where the gas is mixed directly with the air from the heating chambers prior to being delivered into the furnace for combustion. In the case of producer gas the gas is conducted by suitable pipes through gas heating chambers where it is preheated before being delivered to the furnace port, where it is mixed with the air from the air heating chambers and thereafter delivered into the furnace for purposes of combustion. In order to secure proper combustion it is necessary to supply the proper amount of gas to the furnace, and my invention has for one of its objects controlling the gas volume which is supplied to the furnace in a balanced relation to the quantity of air supplied to the furnace, this regulation being accomplished by suitable apparatus controlled by the differential pressures secured by providing in the gas supply line a restricted orifice or Venturi meter or any other suitable means of building up a pressure in the gas supply line and tapping the line on each side of the restricted portion and by suitable apparatus controlling the flow of gas into the furnace by the differential in pressure developed in the gas supply line.

For air control, a restricted orifice, Venturi meter or the like is provided, preferably in the air supply line leading to the regenerators, and by means of suitable apparatus connected to the air supply line on each side of the restricted portion of the air supply pipe, the amount of air supplied to or by the blower is controlled; or, if desired, the speed of the blower may be controlled by the apparatus operated by the differential in pressures in the air supply line. The air control apparatus is properly adjusted with relation to the amount of fuel which is necessary to secure proper combustion in the furnace and once this proper adjustment of the apparatus is secured the proper volume will be maintained throughout the operation of the furnace so that the quantities of air supplied are proper for the best and most efficient operation of the furnace at all times.

Another and further object of my invention is the securing of the proper furnace pressure or draft control by tapping the furnace itself and connecting to the furnace a pipe having a control apparatus secured thereto which is adapted to be maintained in a predetermined position by the combined air and gas pressure in the furnace so that changes in pressures in the furnace will cause the control apparatus to operate in such a manner that the draft created by the main furnace stack or induced draft fan will be under automatic control to meet the requirements of removal of gases of combustion from the furnace.

These and other objects of my invention will be more fully and better understood by reference to the accompanying sheet of drawing, and in which:—

The figure is a diagrammatic view of my invention showing an open hearth furnace in plan section and a control apparatus partially in elevation and partially in section, with underground fuel and air conduits in dotted lines leading to the regenerative chambers of the open hearth furnace.

Referring specifically to the drawing, an open hearth furnace 10 is shown having air regenerators 11 and 12 and gas regenerators 13 and 14 at each end thereof, the air regenerators 11 and 12 being connected to the air inlets by the ports 15, 15 and the gas regenerators 13 and 14 being connected at each end of the furnace by suitable conduits terminating in the gas inlet ports 16 and 17. A plurality of passages 18 are provided which lead to the air regenerators 11 and 12, these passages having an air supply pipe 19 secured thereto having a valve 20 located therein to control the direction of the flow of air from a pipe 21 connected to a turbine or motor driven air blower 22 to which is connected an air supply pipe 23. A plate 24 is provided in the pipe 21 having an orifice 25 therein, a pipe 26 being connected to the pipe 21 above the orifice 25, the said pipe 26 leading to a gasometer 27 having a liquid 28 therein and a bell 29 slidably mounted over a pipe 30 which is connected by means of a pipe 31 to the pipe 21 at the opposite side of the orifice 25. At one side of the bell 29 is mounted a bracket 32 providing a fulcrum mounting for a lever 33 which is connected by means of a rod 34 to the bell 29 in the gasometer 27, a seal 35 being provided to prevent the escape of air from the gasometer 27. Mounted upon the lever 33 by means of a bracket 36 is an electric motor 37 connected by means of suitable gears in a gear box 38 to a rotatable gear shaft 39, which in turn is connected to a weight 40 having a pair of rollers 41, 41 thereon, this counter-weight being adapted to travel on the beam 33 as it is operated by the motor 37 as hereafter described.

A counter-weight 42 is provided on the outer end of the lever 33 for the purpose of properly counter-balancing the motor 37 and weight 40. A motor 43 is provided which is connected to an externally threaded shaft 44 by means of suitable gearing enclosed in a gear box 45, the shaft 44 having an arm 46 connected thereto and which is connected to and controls a butterfly valve 47 positioned in the intake pipe 23 which is connected to the blower 22. The motor 43 is connected by wires 48 and 49 with an upper terminal 50 and a lower terminal 51 so that as the lever 33 moves up and down contact is established between these parts turning motor 43 in one direction or the other and thus opening or closing the butterfly valve 47 and admitting a larger quantity to or decreasing the supply of air furnished to the blower 22, the operation of the beam 33 being controlled by the differential pressure built up on opposite sides of the orifice 25 through the pipes 26 and 31 connected to the gasometer 27.

For operating a furnace with natural or coke-oven gas a gas main 52 is provided connected at each of its ends to the gas ports 16 and 17 and having a supply main 53, a valve 54 being positioned in the main 52 to direct the flow of gas through this main. A restricted orifice 55 is provided in the pipe 53 with a pair of pipes 56 and 57 connected to the main 53 on opposite sides of the restricted orifice, the said pipe 56 leading to a gasometer 58 having a liquid 59 therein and a bell 60 underneath which a pipe 61 is provided which is connected to the pipe 57. The bell 60 has a rod 62 connected thereto which in turn is connected to a lever 63 fulcrumed at 64 on a bracket 64a, the said lever 63 having a motor 65 mounted thereon and connected to a rotatable shaft 66 by means of gears enclosed in a housing 67. The beam 63 has a counter-weight 68 mounted thereon which is in threaded engagement with the shaft 66, a pair of rollers 69, 69 being provided so that the counter-weight will move easily upon the beam 63. A counterweight 70 is placed on the outer end of the beam 63 to compensate for the counterweight 68 and motor 65, the other end of the lever 63 being adapted to engage an upper contact point 72 or a lower contact point 73 connected with suitable wires 74 and 75 to an electric motor 76 which in turn is connected by means of gears in a housing 77 with a threaded shaft 78 to a valve 79 by means of an arm 80, the said valve 79 being located in the main 53 through which the gas passes to the main 52 so that as the gas passes through the main 53 the volume is controlled by the valve 79 which in turn is controlled by the differential in pressure on opposite sides of the orifice 55 through the pipes 56 and 57.

It will be understood from the foregoing description, therefore, that as the resistance to either the flow of the air or the gas into the furnace increases during the operation of the furnace, this resistance results in a decrease in the flow or volume in the air and gas mains, and to counteract this effect an increased pressure of air or gas is created by opening the control valves, thus maintaining the proper supply of both air and gas to the furnace.

The motors 37 and 65 are connected to a suitable source of electric power by means of a double pole switch 81 having suitable leads 82 and 83 leading therefrom, the said motors being equal in power and geared to the shafts 39 and 66 by the same ratio of gearing so that when current is supplied to the motors 37 and 65 the counter-weights 40 and 68 will be placed at the same relative positions with respect to the beams 63 and 33 so that, by experimenting, the operator of the furnace determines the quantity of air and gas which he desires to supply to the furnace and by means of the switch 81 sets the weights 40 and 68 at the proper position on the shafts 39 and 66 so that when the device is in operation these shafts are placed in equilibrium by the differentials in pressure on each side of the orifices 25 and 55 respectively. If it is desired to position these counter-weights on the shafts 39 and 66 at different points this may be done by providing different pitch threads on the shafts 39 and 66, or by providing a slightly different gear ratio connecting the shafts to the motors, so that one of the weights will travel to a different position on the shaft in the same length of time and with the same current as the other counter-weight so that the relationship between these weights can be controlled.

A switch 84 is provided in the circuit leading to the motor 37 and a similar switch 85 in the electric circuit leading to the motor 65 so that should the operator of the furnace desire to change the relationship of either of the weights 40 or 68 the circuit leading to one or the other of the motors 37 and 65 is opened so that when the circuit from the switch 81 is closed only one of the motors will operate so that the counter-weight connected to the particular motor in operation can be positioned by the operator.

The device for controlling an open hearth furnace when producer gas is used and which is continued through the gas regenerators 13 and 14 for purpose of preheating comprises a gas main 86 having a supply main 87 connected thereto and a valve 88 placed therein to control the direction of flow of the gases through the main 86. A restricted orifice 89 is provided in the main 87 to which pipes 90 and 91 are connected which lead directly to the gasometer 58 in exactly the same manner as the pipes 56 and 57 heretofore described or may be connected to the pipes 57 and 56 respectively. The device will operate in exactly the same manner as has been heretofore described with relation to the use of natural gas or coke-oven gas. Valve 113 is employed for the purpose of closing the conduit 86 when fuel is not supplied through the conduit 86 but through the conduit 52.

The foregoing description applies to the fuel supply control apparatus and in order to doubly insure the proper control of the furnace I add a means for controlling the exhaust of the waste gases from the furnace by connecting a pipe 92 at each of its ends to the furnace adjacent the intake ports thereof as shown in the drawing, and having a valve 93 located in said pipe 92 with a second pipe 94 connected to said pipe 92 immediately adjacent the valve 93, the said pipe 94 leading to a gasometer 95 having the usual bell 96 which in turn is connected to a shaft 97, a beam 98 fulcrumed at 99 and having an electric motor 100 mounted thereon connected to a shaft 101 and a counter-weight 102 with a second counter-weight 103 at the opposite end thereof, the said beam 98 having a pair of contacts 104 and 105 which lead to an electric motor 106, which in turn is connected to a shaft 107 and which controls a valve 108 located in a steam supply line 109 which leads to the prime mover of the induced draft fan placed in the mains leading to the furnace stack 110 and by means of which the speed of the fan is controlled to maintain the predetermined furnace pressure at the outlet end of the furnace or the control members may lead to a damper 110a controlling the outlet to the stack 110. The counter-weight 102 is controlled by the motor 100 by means of electrical connections 111 and the switch 112 set by the operator of the furnace to the proper position so that the speed of the fan is sufficient to create the necessary furnace pressure, such pressure being transferred to the bell 96 which counter-balances the weight 102. Any change in the predetermined furnace pressure causes a change through the bell 96 in the gasometer 95 moving the beam 98 into contact with one or the other of the contacts 104 or 105 thus bringing the motor 106 into operation to move the valve 108 in the steam line 109 leading to the prime mover driving the induced fan, thus maintaining the proper predetermined furnace pressure.

When waste heat boilers are not used the furnace gases are conducted directly to the furnace stack 110 by suitable mains, common in blast furnace practice, and the control motor 106 is, as has been described above, connected either to the motor driving the induction fan or to the damper controlling the mains through which these waste gases pass.

In the operation of the preferred embodiment of my invention from the foregoing description it will be understood that the operator by means of the double pole switch 81 positions the weights 40 and 68 on the beams 33 and 63 respectively at the positions desired after the furnace is in operation and any change of flow of gas or air as indicated by variation of the differential pressures will be corrected by unbalancing the bells 29 and/or 60. Gas supplied to the furnace will be increased or diminished automatically through the operation of the motors 43 and 76 without attention on the part of the operator of the fans and insuring that the maximum efficiency is secured in the operation of the furnace at all times.

Though a preferred embodiment of the present invention has been described in detail, it will be clear that many modifications may be made without departing from the scope of the invention. It is intended to cover all such modifications as fall within the scope of the invention as defined by the appended claims.

I claim:

1. A method of controlling combustion in a reducing furnace which consists in conveying fuel to the furnace through a closed conduit, conveying air to the furnace through a second closed conduit, creating a differential in pressure in each of said air and fuel conduits, and independently controlling the volume of fuel and air supplied through said conduits by the variation in the differential in pressure created in each of said air and fuel conduits.

2. A method of controlling combustion in a reducing furnace which consists in conveying fuel to the furnace through a closed conduit, conveying air to the furnace through a second closed conduit, creating a differential in pressure in each of said air and fuel conduits, independently controlling the volume of fuel and air supplied through said conduits by the variation in the differential in pressure created in each of said air and fuel conduits, and maintaining the rate of discharge of gases from said furnace in proportion to the supply of fuel and air conducted to said furnace.

3. The method of controlling combustion in a reducing furnace, which consists in conducting air to the furnace from a supply conduit, conducting fuel to the furnace from a supply conduit, simultaneously and initially adjusting the volumes of air and fuel delivered to the supply conduits, creating a differential in pressure in each of the supply conduits and automatically regulating the volumes of air and fuel delivered to the furnace by utilization of the variation in the differentials in pressure to maintain substantially constant the flow in each of the supply conduits.

4. The method of controlling combustion in a reducing furnace, which consists in conducting air to the furnace from a supply conduit, conducting fuel to the furnace from a supply conduit, simultaneously and initially adjusting the volumes of air and fuel delivered to the supply conduits, creating a differential in pressure in each of the supply conduits, automatically maintaining constant the volumes of air and fuel delivered to the furnace, by utilization of the variation in the differentials in pressure to control the flow in each of the supply conduits, conducting the waste gases from the furnace and automatically maintaining a constant pressure of the waste gases.

5. The method of controlling combustion in a reducing furnace, which consists in conducting air to the furnace from a supply conduit, conducting fuel to the furnace from a supply conduit, heating the air and fuel delivered to the furnace, simultaneously and initially adjusting the volumes of air and fuel delivered through the supply conduits, and independently maintaining the volumes of both the air and fuel constant by creating a differential in pressure in each of the supply conduits and varying the flow therein in accordance with the variation of the differential in pressure.

Signed at Chicago, Illinois, this 5th day of June, 1925.

GEORGE R. McDERMOTT.